United States Patent [19]

Gano et al.

[11] Patent Number: 4,542,044

[45] Date of Patent: Sep. 17, 1985

[54] METHOD AND APPARATUS TO AUTOMATICALLY APPLY A LIQUID DUST INHIBITOR TO FIBERGLASS BLOWING WOOL

[75] Inventors: Barclay P. Gano, Granville; James L. Rucker, Worthington, both of Ohio

[73] Assignee: Owens-Corning Fiberglas Corporation, Toledo, Ohio

[21] Appl. No.: 552,937

[22] Filed: Nov. 17, 1983

[51] Int. Cl.⁴ .......................... B05D 7/00; B05B 17/00
[52] U.S. Cl. ..................................... 427/215; 427/220; 427/424; 118/303; 118/314; 118/315; 118/684
[58] Field of Search ...................... 241/33, 35; 427/10, 427/215, 220, 290, 292, 424; 118/703, 712, 668, 679, 682, 684, 314, 315, 303

[56] References Cited

U.S. PATENT DOCUMENTS

| | | | |
|---|---|---|---|
| 2,660,763 | 12/1953 | Robinson et al. | 19/66 |
| 3,940,545 | 2/1976 | Williams | 427/215 |
| 4,302,488 | 11/1981 | Lowi, Jr. | 427/290 |

Primary Examiner—Sam Silverberg
Assistant Examiner—Ken Jaconetty
Attorney, Agent, or Firm—Ronald C. Hudgens; Ted C. Gillespie; Ronald E. Champion

[57] ABSTRACT

A method and apparatus for applying a dust inhibitor consisting of a 50% oil, 50% water emulsion in a ratio of 0.5% by weight to milled fiberglass blowing wool is disclosed. The apparatus senses the weight of fiberglass being milled and selectively and automatically sprays the emulsion on the fiberglass as it is being transported through the production system.

16 Claims, 2 Drawing Figures

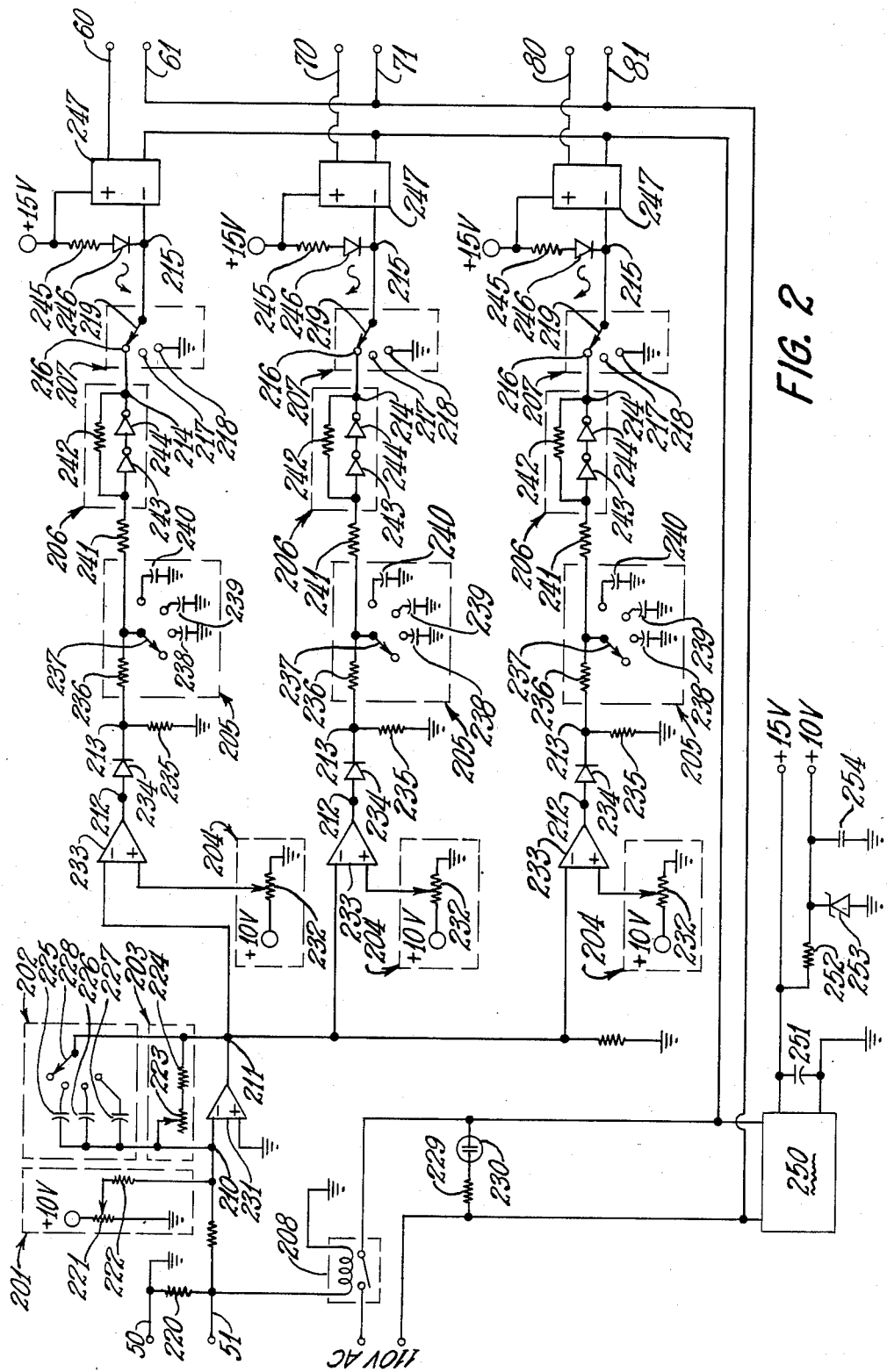

METHOD AND APPARATUS TO AUTOMATICALLY APPLY A LIQUID DUST INHIBITOR TO FIBERGLASS BLOWING WOOL

TECHNICAL FIELD

The present invention describes a method and apparatus to apply a dust inhibitor of a known percentage by weight of an oil water emulsion to milled fiberglass products for the purpose of producing a fiberglass blowing wool. The apparatus detects the amount of product being fed into the system and automatically adjusts the amount of oil water emulsion being sprayed on the product based upon the amount of product sensed moving through the system.

BACKGROUND ART

Fiberglass blowing wool can be manufactured by using a hammermill to chop continuous or discontinuous glass fibers into a length suitable for use as a blowing wool insulation. The process of converting the input product into a chopped length fiber produces extremely small fibers hereinafter referred to as dust which may be borne by the air. These small air borne fibers have an adverse effect in applying the wool in its final installation in the housing market. It has been found that by spraying the product after it has been milled with a weight percentage of ½% by weight of a 50% oil and 50% water mixture as a dust inhibitor, the amount of small milled fibers capable of being carried by the air is reduced. The present invention provides a method to automatically dispense the proper percentage of the oil water emulsion to the milled fiberglass during the production process.

DISCLOSURE OF THE INVENTION

Various scrap fiberglass products, such as high density ceiling board and low density wool insulation, are fed by means of a conveyor to a hammermill. The hammermill is driven by an electric motor. The current and voltage in the legs of the 440 volt AC three-phase power lines are fed to a watt transducer. The watt transducer converts the inputted signals to a 4 to 20 milliamp signal which is proportional to the amount of power drawn by the motor of the hammermill. The amount of power drawn by the motor of the hammermill is proportional to the amount of product being fed into the hammermill. The product exits the hammermill into a feed pipe and is transported through the system by a suction blower which is driven by a second 440 volt AC three-phase motor. An interlock system is used on the second motor to determine whether or not the suction fan is transporting material through the system. A current detector is placed on one leg of the input power to the suction fan motor and activates a 110 volt relay. When the motor is operating, the 110 volt relay activates a solenoid valve on the liquid supply tank such that it allows liquid to flow only when power is being inputted to the suction drive motor. A series of three spray nozzles two on one side and one on the other are horizontally opposed in the delivery tube between the hammermill and the suction blower. These are connected to a supply of high pressure air such that air is continuously being forced through the nozzles to keep them clear even when liquid is not present. A liquid supply tank interconnected through the solenoid valve with the interlock system and a flow regulator are connected to three solenoid operated valves. A controller receives a signal from the watt transducer of the hammermill drive motor and activates a set of solenoid controlled valves connected to the liquid supply reservoir to activate either 1, 2, or 3 of the spray nozzles simultaneously. In this manner, the amount of dust inhibitor to be supplied to the material is directly proportional to the amount of material being transported through the system.

BRIEF DESCRIPTION OF THE DRAWINGS

FIG. 2 is a schematic diagram of the controller which automatically controls the flow of the dust inhibitor.

BEST MODE FOR CARRYING OUT THE INVENTION

Figure 1:
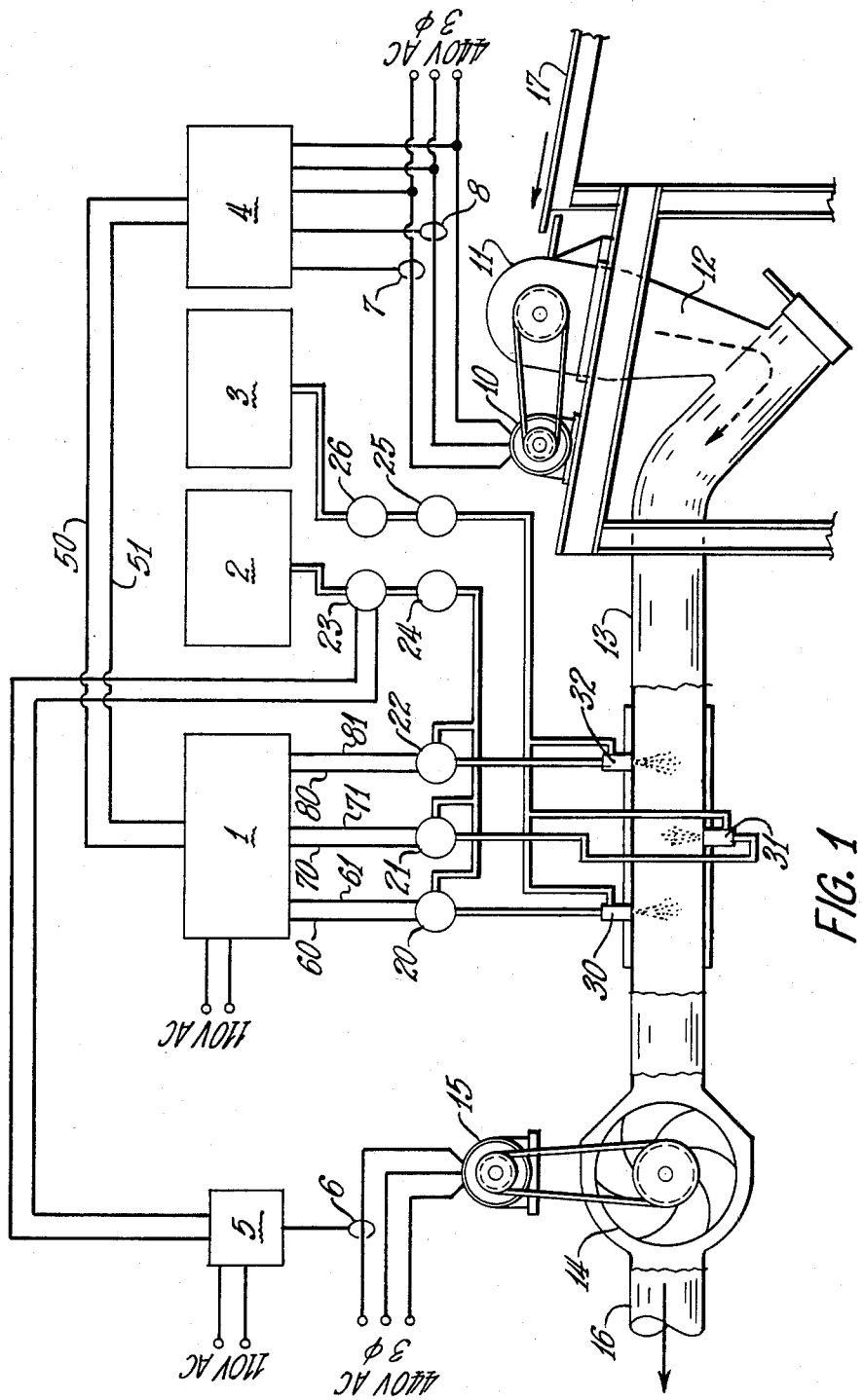
FIG. 1 is a diagramatic view of the apparatus for applying liquid dust inhibitor to fiberglass blowing wool.

Fiberglass blowing wool is a product which is produced by chopping long and semi-long glass fibers into short glass fibers such that the product may be conveyed by air into the area to be insulated. The short length fiberglass wool is, in effect, blown onto the area to be insulated. During the manufacturing process, however, extremely short fibers, which can be suspended in air are produced. This material would be disruptive in the installation process, and a dust inhibitor must be applied to the material as it is being produced. This detailed description explains how a dust inhibitor can be applied to the material as it is being produced in a set percentage ratio by weight.

Material to be produced into a fiberglass blowing wool is transported by means of a conveyor number 17 into a hammermill number 11. The hammermill 11 is powered by a drive motor 10 which is a 440 volt AC three-phase motor. The material, after it exits the hammermill 11, falls down a gathering tube 12 into a transport tube 13. The material is transported through the system by a suction blower 14 which is driven by a second 440 volt AC three-phase electric motor 15. The material then exits the supply tube by way of exit number 16 for further manufacturing processes and packaging.

A series of three spray nozzles number 30 through number 32 are horizontally opposed in the delivery tube between the hammermill 11 and the suction blower 14. The spray nozzles, such as nozzle 30, can be units such as ¼ JCO with number 26b setups manufactured by E. I. Pfaff Company of Cleveland, Ohio. These nozzles have an inlet for liquid flow, an inlet for atomizing air, and an inlet for air shut-off. All of the nozzles are connected together through a high pressure air supply line which leads to a ball valve 25 and a pressure regulator 26 and a supply of high pressure air 3. Nozzle 30 is connected to a solenoid controlled liquid flow valve 20, a liquid pressure regulator 24 and solenoid control valve 23 to liquid supply 2. As previously mentioned an interlock is provided by relay 5 to flow control valve 23 to prevent the liquid dust inhibitor from flowing to the nozzles if suction fan 14 is not operating. If suction fan 14 is not operating, then no material is being transported through the supply tube 13.

The solenoid control valve 20 is normally closed and only activated when a signal is received on control lines 60 and 61. The signal to activate electric solenoid valve 20 comes from controller 1 and is activated as will be explained later. In a similar matter, atomizing spray nozzle 31 is connected to a liquid flow path from electrically activated solenoid valve 21. The liquid to solenoid valve 21 is also supplied through the pressure regulator 24 to solenoid activated valve 23 from liquid supply reservoir 2. Signal lines 70 and 71 must be activated by controller 1 in order for solenoid valve 21 to allow liquid to flow to nozzle 31. The third nozzle 32 has its liquid supply line connected to solenoid valve 22. This again receives its liquid from pressure regulator 24 and solenoid controlled valve 23 from liquid supply reservoir 2. The control lines 80 and 81 to solenoid activated valve 22 must be activated by controller 1 in order to supply liquid to atomizing nozzle 32.

The hammermill 11 drive motor 10 is a 440 volt three-phase electric motor. Three power lines, one for each phase, supplies power to the motor. Two of the lines have current transducers 7 and 8 connected around them in order to sense the current flowing in the lines. These two transducers are connected to a watt transducer 4. Also connected to the watt transducer 4 is a voltage tap for each line being fed to the motor. Watt transducer 4 is similar to a model PC5-63E manufactured by Ohio Semitronics of Columbus, Ohio. This unit produces a 4 to 20 milliamp output signal which is proportional to the wattage drawn by motor 10. This 4 to 20 milliamp signal is fed by signal lines 50 and 51 to controller 1. Referring to FIG. 2 controller 1 is an electronic device which switches the solenoid actuated valves 20, 21 and 22 based upon the wattage sensed in drive motor 10.

It has been found by experimentation that when a fiberglass wool feed rate of 30 pounds per minute is fed to hammermill 11, the motor 10 will draw 20% of the available power. Similarly, when a fiberglass wool feed rate of 70 pounds per minute is fed to the hammermill, motor 10 draws 40% of its available power. One hundred forty (140) pounds per minute feed rate to the hammermill causes the electric motor 10 to draw 70% of its available power.

The 4 to 20 milliamp signal produced by the watt meter is proportional to the amount of power being drawn by motor 10. This signal is fed on signal lines 50 and 51 to the controller 1. The 4 to 20 milliamp input signal on control lines 50 and 51 is dropped across a resistor 220 to produce a voltage signal input to the controller. The voltage signal is also fed to a 110 volt normally open relay 208. This relay is in series with the 110 volt power input to the controller. When a signal is seen on control line 51, the relay is closed allowing the 110 volt AC power to be fed to a DC power supply 250. An indicator lamp 230 and a dropping resistor 229 are placed across the 110 volt AC power line to indicate that power is being fed to power supply 250. Power supply 250 is a commercially available, plus 15 volt DC power supply similar to a Sola type 85-15-2120. The output of the power supply 250 is filtered by a filter capacitor 251. The 15 volt signal is available for use in the circuitry of the controller and is further dropped to a plus 10 volt DC by means of a resistor 252 and a Zener diode 253.

A filter capacitor 254 is also used on the output of the 10 volt supply. Signal line 51, as it is inputted to the controller 1, is dropped across a series resistor. A zero adjustment circuit 201 is provided to balance out the signal on control line 51. The zero adjustment circuit 201 consists of a plus 10 volt power supply, a variable potentiometer 221 and a series resistor 222. An input filter 202 is provided across an operational amplifier 231. The input filter 202 consists of a multiposition switch 228 which can switch in a series of filter capacitors 225, 226 and 227. A position is also provided where no filter capacitor is in the circuit. A span adjustment circuit 223 consists of a fixed resistor 224 and a variable resistor 223 which forms a feedback circuit for operational amplifier 231 between nodes 210 and node 211. The signal input to operational amplifier 231 is on the negative input of the operational amplifier. Typical voltage signals at node 210 would be a minus 4 volts to a minus 2 volts. At node 211, a typical voltage signal would be 0 to 10 volts DC.

The voltage signal at node 211 is fed to three identical circuits. The first circuit controls control lines 60 and 61 which activate solenoid activated valve 20. The second circuit controls control lines 70 and 71 which activate solenoid control valve 21, and the third circuit controls control lines 80 and 81 which activate solenoid control valve 22. A detailed description will be given of the circuit branch which controls control lines 60 and 61, understanding, of course, that the other two branches are identical in operation but merely different in adjustments of the variable portion of the electronic circuitry. The signal from node 211 is fed to the negative side of an operational amplifier 233. This operational amplifier is ¼ of an HA-4602 operational amplifier.

The positive side of operational amplifier 233 goes to a set point adjustment circuit 204. The set point adjustment circuit 204 consists of a plus 10 volt DC power supply and a variable potentiometer 232. Variable potentiometer 232 is a 50 K potentiometer. The output of operational amplifier 233 goes to node 212 wherein the signal can be a plus 15 or a minus 15 volts. This is blocked by a diode 234 which typically is a 1N914 diode. This signal is then fed to node 213 where the signal is typically either plus 15 volts or 0 volts. The signal then is fed to a time delay adjustment circuit 205. This consists of an RC or resistance capacitance time delay consisting of resistor 236 and a switch 237 which can interconnect capacitors 238, 239 or 240 into a bridge type time delay circuit. The time delay circuit is necessary because the distance from the hammermill and the supply chute 12 to the area where the nozzles are located is a finite length, and it takes the product being produced by the hammermill a finite time to travel this distance. Therefore, the spray nozzles 30, 31 and 32 must be activated when the material is present at the nozzles rather than sensed at the hammermill. This means the signal must be delayed from the time that it is initially read at the hammermill until the time that the spray nozzles start dispensing liquid.

The time delay signal is now dropped across a series resistor 241 and proceeds to a Schmidt trigger circuit 206. The Schmidt trigger circuit consists of two invertors 243 and 244 with a feedback resistor 242 across them. The signal at node 214 is now the actuation signal. At node 214 the voltage would be low for activating the solenoids and high for turning the solenoids off. The signal now proceeds to a selector switch 207. The automatic position is indicated by node 216. Node 217 would be the off position, and node 218, which is connected to ground, would be the on position. As was previously mentioned, when the signal at node 214 is low or grounded, then the solenoid valve 20 would be activated by control lines 60 and 61. This is possible because a solid state relay 247 is biased by a plus 15 volts which is dropped across a dropping resistor 245 to a light emitting diode 246 and connected to the negative port of the solid state relay via node 215. When the selector switch 207 is moved to the off position 217, 15 volts is impressed on the negative side of the solid state relay and plus 15 volts is impressed on the positive side. Hence, control lines 60 and 61 are not emitting a signal. If, however, the selector switch 207 is in position 218, the 15 volts through the light emitting diode will be dropped to ground, and there will be 15 volts on the positive side of solid state relay 247 and 0 volts on the negative side and, therefore, a control signal of 110 volts will be applied to the solenoid control valve 20.

The theory of operation of the circuit is as follows. Set point adjustment 204 for each of the three branches is adjusted such that the circuit will activate when the input signal at node 211 reaches a specific level. For instance, control lines 60 and 61 may be set by potentiometer 232 to activate when the wool feed rate input into the hammermill reaches at least 30 pounds per minute. This is accomplished by adjusting potentiometer 232. The second set of nozzles activated through control lines 70 and 71 can be set to actuate when the wool feed rate reaches at least 70 pounds per minute, and this can be accomplished by adjusting the potentiometer 232 in that branch of the circuit. Similarly, the control lines 80 and 81, which control the last pair of nozzles, can be set to actuate when the rate at the hammermill reaches at least 140 pounds per minute. In this manner 1, 2 or 3 nozzles will be activated depending upon the amount of product sensed.

Experimentation has shown that when the ¼ JCO spray nozzles with the 26B set-up are activated with a 50% oil-water emulsion mixture at a pressure of 10 psi and an air pressure of 12 psi a liquid flow of 1.9 gallons per hour is produced. Twenty (20) psi liquid pressure and 22 psi air pressure produces a liquid flow of 3.3 gallons per hour. Thirty (30) psi liquid pressure and 30 psi air pressure produces 5.1 gallons per hour liquid flow. The liquid pressure is controlled by liquid pressure regulator 24 and the air pressure is controlled by pressure regulator 25.

One of the objects of the invention is to produce an average application of the dust suppressant 50% oil, 50% water emulsion in a ratio of 0.5% by weight of the emulsion to the weight of the milled glass fibers. The fibrous glass material being fed to the hammermill does not have a constant volume flow into the hammermill. The first nozzle is activated when the feed rate to the hammermill reaches 30 pounds per minute. At a feed rate of 30 pounds per minute the emulsion mixture is being applied at the rate of 0.81% by weight. This percentage decreases exponentially to 0.3% by weight at a feed rate of 70 pounds per minute. At a feed rate of 70 pounds per minute the controller activates the second nozzle in conjunction with the first. The percentage application ratio now becomes 0.7% by weight and decreases exponentially to 0.3% by weight at a feed rate of 140 pounds per minute. The third nozzle in conjunction with the first and second are activated when the feed rate reaches 140 pounds per minute. With all nozzles activated and a feed rate of 140 pounds per minute the percentage application ratio is 0.55%. This ratio also decreases to 0.3% at a feed rate of 220 pounds per hour. This sequential application technique yields an overall application ratio of 0.5% of the oil-water emulsion mixture to the glass fibers by weight.

Light emitting diodes 246 give an indication of when the nozzles are being activated. Similarly, the time delay adjustment 205 can be set individually for each nozzle because of nozzle is situated linearly along the flow path of the material. In this manner, as material is fed into the hammermill, one nozzle will begin to actuate when the material in the flow tube 13 reaches the nozzle. As the amount of material fed into the hammermill increases, successive nozzles are activated to attempt to maintain 0.5% oil emulsion mixture by weight being sprayed onto the material being transported through the supply tube.

INDUSTRIAL APPLICABILITY

This system allows a 50% water and oil emulsion mixture to be sprayed onto fiberglass blowing wool in a set percentage by weight automatically to prevent dust from being formed when the product is applied as insulation.

We claim:

1. An apparatus for applying a dust inhibitor to milled glass fibers comprised of: a means for determining the weight of glass fibers milled; a means for transporting said glass fibers along a supply tube; a plurality of spray nozzles positioned along said supply tube; a source of air to constantly supply air through said spray nozzle; a plurality of solenoid controlled valves connected to a source of liquid dust inhibitor, each of said plurality of solenoid controlled valves associated with an individual spray nozzle of said plurality of spray nozzles; and a means to concurrently activate in sequential combination said solenoid controlled valves in stepped response to the weight sensed to apply the dust inhibitor to the glass fibers in a stepped percentage by weight to the weight of the glass fibers sensed.

2. An apparatus as recited in claim 1 wherein the weight determining means is comprised of: a hammermill for milling fiberglass products into discrete glass fibers; an electric motor for driving the hammermill; and a watt transducer to determine the amount of power being drawn by the electric motor.

3. An apparatus as recited in claim 1 wherein the means for applying the dust inhibitor is comprised of: a liquid reservoir to hold a liquid dust inhibitor; a pressure regulator for regulating the pressure of the liquid flow from the reservoir; solenoid control valves interconnected through said pressure regulator for allowing selective flow of the liquid; a spray nozzle connected to each solenoid control value for spraying liquid dust inhibitor onto the milled glass fibers when the solenoid control valve is activated; and a controller which receives the weight of glass fibers sensed and selectively activates the solenoid control valves based upon the weight sensed.

4. An apparatus for applying a dust inhibitor in a stepped percentage ratio by weight to milled fiberglass to produce a blowing wool insulation comprising: a means to sense the weight of fiberglass being milled; a means for transporting said glass fibers along a supply tube; a plurality of spray nozzles positioned along said supply tube; an air supply constantly supplying an air flow through said spray nozzle; a plurality of solenoid controlled valves connected to a source of liquid dust inhibitor, each of said plurality of solenoid controlled valves associated with an individual spray nozzle of said plurality of spray nozzles; and a control means responsive to the weight of fiberglass being milled for activating in sequential combination said plurality of solenoid controlled valves.

5. An apparatus as recited in claim 4 wherein the means to sense the weight of fiberglass being milled comprises: a hammermill driven by an electric motor; a watt transducer interconnected to said electric motor to sense the amount of power drawn by said motor; and a signal line to couple a signal produced by the watt transducer which is proportional to the amount of power drawn by the electric motor to the controller.

6. An apparatus as recited in claim 5 wherein the controller receives the signal from the watt transducer and selectively activates one or more of the solenoid controlled valves in combination to increase the liquid supply volume proportional to the power drawn by the electric motor driving the hammermill.

7. An apparatus as recited in claim 4 wherein the control means is comprised of: an electronic circuit having an interlock to prevent flow of dust inhibitor to said spray nozzles if no fiberglass is being milled; a zero adjustment means, an input filter and a span adjustment means to modify a signal inputted to the controller; and three identical electronic circuit branches including a set point adjustment means, a time delay adjustment means, and a mode selector means for selectively activating solid state relays within said controller to supply power to the solenoid controlled valves.

8. An apparatus as recited in claim 4 wherein the dust inhibitor is an emulsion of 50 percent oil compound and 50% water.

9. An apparatus as recited in claim 8 wherein the emulsion is applied to the milled fiberglass in stepped response to the weight of fiberglass milled in an average ratio of 0.5% emulsion to 99.5% fiberglass by weight.

10. An apparatus for spraying a dust inhibitor onto milled glass fibers comprising:
(a) a hammermill for milling fiberglass products into discontinuous glass fibers;
(b) an electric motor for driving said hammermill;
(c) a sensing means connected to said electric motor for sensing the amount of power drawn by said motor and for producing a signal proportional to the amount of power drawn by the motor;
(d) a plurality of liquid spray means for spraying a dust inhibitor onto the milled glass fibers;
(e) an air supply connected to said plurality of spray means for constantly applying an air flow through said spray means;
(f) a plurality of solenoid controlled valve means, one of said plurality of solenoid controlled valves connected to each liquid spray means said plurality of liquid spray means to allow liquid dust inhibitor to flow to selective combination of liquid spray means when that solenoid controlled valve is activated; and
(g) a control means receiving said signal from said sensing means and sequentially activating in combination said plurality of solenoid controlled valve means in stepped response to the magnitude of the signal.

11. A dust inhibitor spraying apparatus as recited in claim 10 wherein said sensing means is a watt transducer which senses the power drawn by the electric motor and produces a 4–20 milliampere signal which is proportional to the amount of power drawn.

12. A method of applying a dust inhibitor to milled glass fibers comprising the steps of: sensing the weight of milled glass fibers; transporting said glass fibers along a supply tube; positioning a plurality of spray nozzles along said supply tube; and air supply means for constantly applying air pressure through said spray nozzles; connecting a plurality of solenoid controlled valves between a supply of liquid dust inhibitor and each individual spray nozzle of said plurality of spray nozzles; and applying a dust inhibitor to said fibers in a stepped percentage by weight by selectively activating in combination one or more of said plurality of said solenoid controlled valves in stepped response to the weight of glass fibers sensed.

13. A method as recited in claim 12 wherein the step of sensing the volume of milled glass fibers is further comprised of: feeding fiberglass products into a hammermill; driving the hammermill with an electric motor; sensing the amount of power drawn by the drive motor of the hammermill; and producing a signal proportional to the amount of power sensed.

14. A method as recited in claim 12 wherein the step of applying a dust inhibitor to said fibers in stepped percentage by weight of glass fibers sensed is further comprised of: selectively spraying the dust inhibitor through spray nozzles; controlling the liquid flow by selectively activating more of the solenoid controlled valves; activating the solenoid controlled valves through energizing solid state relays; activating the solid state relays with a controller which is controlled by a signal from the means which senses the weight of the glass fibers being milled.

15. An apparatus for applying a dust inhibitor to milled glass fibers comprised of:
(a) a hammermill for chopping glass fibrous material into discrete glass fibers;
(b) a means to drive said hammermill;
(c) a means to power said drive means, said power being proportional to the amount of said glass fibers being milled;
(d) a means for sensing the power drawn by said drive means and for producing a signal proportional to the power sensed;
(e) a means for transporting said glass fibers along a supply tube;
(f) a plurality of spray nozzles positioned along said supply tube;
(g) an air source continuously applying air through said plurality of spray nozzles;
(h) a plurality of solenoid controlled valves connected to a source of liquid dust inhibitor, each of said plurality of solenoid controlled valves associated with an individual spray nozzle of said plurality of spray nozzles;
(i) a control means to concurrently activate in sequential combination said solenoid control valves in stepped response to said signal produced; and
(j) a delay means associated with said control means for delaying said actuation of said solenoid control valves to compensate for time of flight of said glass fibers from said hammermill along said supply tube to said spray nozzles.

16. A method for applying a dust inhibitor to milled glass fibers comprising the steps of:
(a) milling glass fibrous material into discrete glass fibers by means of a hammermill;
(b) driving said hammermill with a drive means whose power consumption is proportional to the amount of glass fibrous material milled;
(c) producing a signal proportional to the amount of power drawn by said hammermill drive means;
(d) transporting said milled glass fibers from said hammermill along a supply tube;

(e) placing a plurality of spray nozzles along said supply tube;
(f) continuously supplying air from an air supply through said spray nozzles;
(g) connecting each of said plurality of spray nozzles to an individual solenoid controlled valve, said solenoid controlled valve being connected to a source of liquid dust inhibitor; and
(h) sensing said signal produced and concurrently activating in sequential combination each of said solenoid controlled valves in stepped response to said signal sensed.

* * * * *